(12) United States Patent
Braggin

(10) Patent No.: US 9,889,899 B2
(45) Date of Patent: Feb. 13, 2018

(54) SAFETY DEVICE FOR ALERTING MOTOR VEHICLE DRIVERS OF PROXIMITY OF A BICYCLIST

(71) Applicant: Jeffrey L. Braggin, Sunnyvale, CA (US)

(72) Inventor: Jeffrey L. Braggin, Sunnyvale, CA (US)

( * ) Notice: Subject to any disclaimer, the term of this patent is extended or adjusted under 35 U.S.C. 154(b) by 210 days.

(21) Appl. No.: 14/806,639

(22) Filed: Jul. 22, 2015

(65) Prior Publication Data
US 2016/0023703 A1    Jan. 28, 2016

Related U.S. Application Data
(60) Provisional application No. 62/027,923, filed on Jul. 23, 2014.

(51) Int. Cl.
*B62J 6/00*    (2006.01)
(52) U.S. Cl.
CPC ...................... *B62J 6/00* (2013.01)
(58) Field of Classification Search
CPC ........................................................ B62J 6/00
See application file for complete search history.

(56) References Cited

U.S. PATENT DOCUMENTS

| | | | | |
|---|---|---|---|---|
| 3,967,575 A * | 7/1976 | Coutts | ...................... | B62J 27/00 116/35 A |
| 4,011,443 A * | 3/1977 | Smith | ........................ | B62J 6/00 340/432 |
| 4,875,142 A * | 10/1989 | Spector | .................... | B62J 6/005 362/202 |
| 5,663,628 A * | 9/1997 | Fujii | ..................... | H01M 10/44 320/166 |
| 2014/0092612 A1* | 4/2014 | Freiser | ................. | B60Q 1/2657 362/473 |

FOREIGN PATENT DOCUMENTS

CN            2052473 U    *   2/1990

\* cited by examiner

*Primary Examiner* — Mary Ellen Bowman
(74) *Attorney, Agent, or Firm* — John Chandler

(57) ABSTRACT

Disclosed is a safety device designed to alert motor vehicle drivers about the proximity of a bicyclist. The device includes a flexible antenna or rod that readily and preferably mounts in a substantially horizontal orientation to the handlebars of a bicycle. A bright red light or LED at the end of the antenna emits light in a rearward direction and thereby provides a second point of reference to motor vehicle drivers when used in conjunction with a traditional frame-mounted reward facing light. With two points of reference, motor vehicle drivers are able to determine with increased accuracy the proximity of the bicyclist. The antenna is extendable up to about twenty-four to thirty-six inches beyond a lateral edge of a bicycle. The device warns motor vehicle drivers of the proximity of a bicyclist and creates a safety buffer zone for the bicyclist.

20 Claims, 5 Drawing Sheets

SAFETY DEVICE FOR ALERTING MOTOR VEHICLE DRIVERS OF PROXIMITY OF A BICYCLIST

This application claims the benefit and filing date of U.S. provisional patent application filed on 23 Jul. 2014 and having Ser. No. 62/027,923.

BACKGROUND

Field

The present invention relates generally to bicycles, and more particularly, to a safety device for encouraging overtaking motorists to give wide berth to bicyclists, especially at night.

Related Art

Bicycles are in near constant conflict with drivers of motor vehicles due to the situation where an automobile overtakes a bicyclist traveling in the same direction on a roadway. All too often, bicyclists are hit by motor vehicles because of poor driver judgment. The motor vehicle driver must simultaneously balance the risk of passing closely to an unpredictable bicycle operator and anticipating traffic in an oncoming lane or traffic in a second (left) lane where other vehicles may be traveling in the same direction. The conflict is exacerbated at night due to the possibility of the bicycle providing little to no rear-facing lighting to overtaking vehicle operators. The motor vehicle driver may have little time in which to react to the presence of a bicyclist who is either in the vehicle driver's lane of travel or possibly proximate to the lane of travel—on the opposite side of the right bordering white line that forms a boundary between the bicyclist and the lane of travel.

A few States have passed laws to help give motor vehicle drivers guidance on how much space to give a bicyclist. For example, in September 2014, California passed Assembly Bill No. 1371, the Three Feet for Safety Act, which requires that motor vehicle drivers give at least three feet of clearance to a bicyclist when overtaking a bicyclist traveling in the same direction as the motor vehicle. While such laws are well intentioned, these laws fail to require a change in equipment which would provide bicyclists and motorists an actual increase in safety. Further, enforcement of these laws is likely to be lax. Yet further, there is little evidence that improved bicycle-friendly laws alone can reduce the incidence of motorist-bicyclist accidents. Currently, there are no devices that specifically address a legally required distance between a motor vehicle and a bicyclist when the vehicle is passing a bicyclist.

Accordingly, there is a substantial opportunity to improve the safety and peace of mind of bicyclists, and to provide increased visibility of bicyclists to drivers of motor vehicles irrespective of existing or improved laws designed to encourage bicyclist safety.

SUMMARY

Embodiments of the invention described herein relate to providing increased visibility of bicyclists to motor vehicle drivers when bicyclists are in or proximate to a lane of travel. Motor vehicle drivers often do not allow sufficient space when passing bicyclists. The device described herein provides benefits and advantages not previously available in other devices.

The safety device includes a generally horizontally-mounted, telescopically-adjustable, flexible antenna or rod that readily and reversibly mounts to the handlebars or other part of a bicycle. Preferably, a bright red light of a tubular shape is mounted proximate to or at the end of the rod. The red light warns motor vehicle drivers about a left-most location relative to a bicyclist. The length of the device can be easily adjusted when riding side-by-side with other cyclists or to accommodate riding conditions.

This Summary is provided to introduce a selection of concepts in a simplified form that are further described below in the Detailed Description. This Summary is not intended to identify key or essential features of the claimed subject matter, and thus is not intended to be used to limit the scope of the claimed subject matter.

BRIEF DESCRIPTION OF THE DRAWINGS

While the appended claims set forth the features of the invention with particularity, the invention, together with its objects and advantages, is more readily appreciated from the following detailed description, taken in conjunction with the accompanying drawings. Throughout, like numerals generally refer to like parts. Unless specifically indicated, the components and drawings are not shown to scale.

DETAILED DESCRIPTION

Overview. There is a substantial need to provide improved visibility and warning to motor vehicle drivers when overtaking bicyclists, especially at night when visibility is especially low. Prior to the instant invention, a typical scenario is as follows. A bicyclist installs and actuates a single rear-facing red light. The bicyclist travels along the right side of a road. As the motor vehicle driver approaches on this road, she sees a single light. Even if the light is flashing, it is often difficult to gauge the exact position of the bicyclist relative to the road until the motor vehicle is quite close to the bicyclist. This is especially true when the motor vehicle and bicycle are rounding a curve in the road. Sometimes this distance feels dangerous to the bicyclist. Unless the driver had already started to adjust the position of the motor vehicle relative to the lane of travel at the first sign of the rear-facing red bicycle light, the motor vehicle often passes close the bicyclist. This distance is sometimes too close and in violation of some existing bicycle laws. Further, this distance leaves little room for error.

Alternatively, if the motor vehicle has approached close to the bicyclist, the driver must aggressively steer away from the bicyclist. From the point of the view of the bicyclist, it is a bit tedious to track each vehicle that is overtaking the bicyclist with the worry that any given driver may bring the motor vehicle excessively close to the bicyclist when passing. An impact or scare may result if the driver merely avoids missing the rear-facing red light because this light is typically affixed to the frame of the bicycle—the center of body of the bicyclist. What is needed is at least one additional red rear-facing light that is offset from bicyclist.

Figure 1:
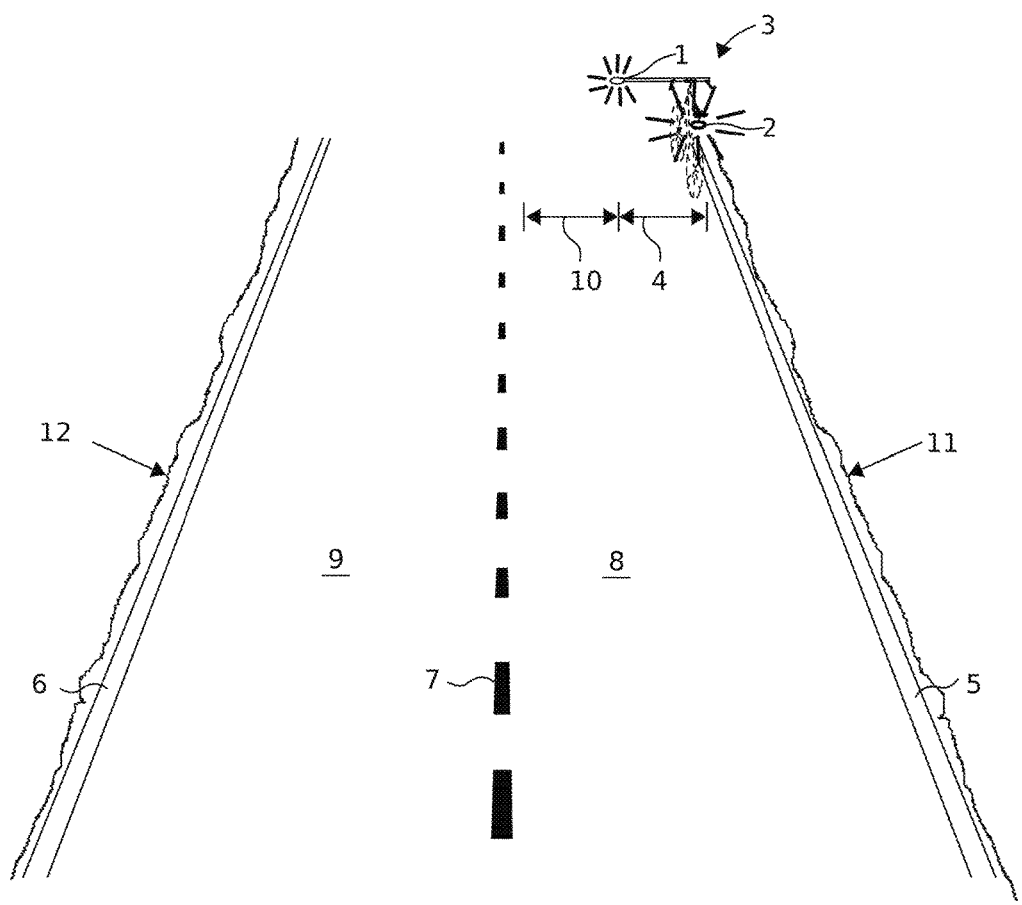
FIG. 1 is perspective view at night along a road, the view of a bicycle equipped with a device according to an embodiment of the instant invention.

FIG. 1 is perspective view at night along a road, the view of a bicycle equipped with a device according to an embodiment of the instant invention. With reference to FIG. 1, a second light 1 is provided in addition to a typical first rear-facing red tail light 2. The second light 1 may be a rear-facing light. The first rear-facing light 2 is mounted to a frame, seat post or other part of a bicycle 3. The second light 1 is telescoped away from the bicycle 3, preferably away from the left side of the bicycle 3.

The bicycle 3 is shown in dashed lines to simulate that a driver of a motor vehicle (not shown) ordinarily does not see the bicycle 3 with substantial clarity when overtaking the bicycle 3 at night. Instead, the driver observes a second light 1 offset from the first light 2 by a distance 4. The bicycle 3 is shown without a rider or bicyclist for sake of simplicity of illustration. The motor vehicle driver also observes a first white line 5 on the right margin 11 of the road and a second white line 6 on the left margin 12 of the road. A yellow or white center line 7 is observable down the center of the road. The center line 7 separates the road into a first or right lane 8 and a second or left lane 9.

The bicycle 3 is advancing somewhat proximate to the right side of the right lane 8. In dark circumstances, a single first rear-facing light 2 generally does not provide sufficient reference for a motor vehicle driver to substantially identify the position of the bicycle 3 relative to the road or the right lane 8 due to the variability in (1) brightness of the particular second light 2, and (2) speed of travel of the bicycle 3, at least until sufficient light from the headlights of the motor vehicle reflects from the bicyclist or bicycle 3. With a second point of reference, the second light 1, the driver is able to position the motor vehicle a passing distance 10 away from the left-most and second light 1. From the perspective of the bicyclist operating the bicycle 3, the distance that the motor vehicle passes is the sum of the distance between the first light 2 and second light 1, and the passing distance 10. Psychologically, this increased distance feels safer for both the driver and bicyclist. In fact, the sum of the distances 10, 4 is the actual passing distance between the motor vehicle (not shown) and the bicycle 3 when the motor vehicle passes the bicycle 3. In effect, the second light 1 mounted on the distal end of the telescopic antenna, creates a safety buffer zone between the motor vehicle 13 and the bicyclist 20.

Figure 2:
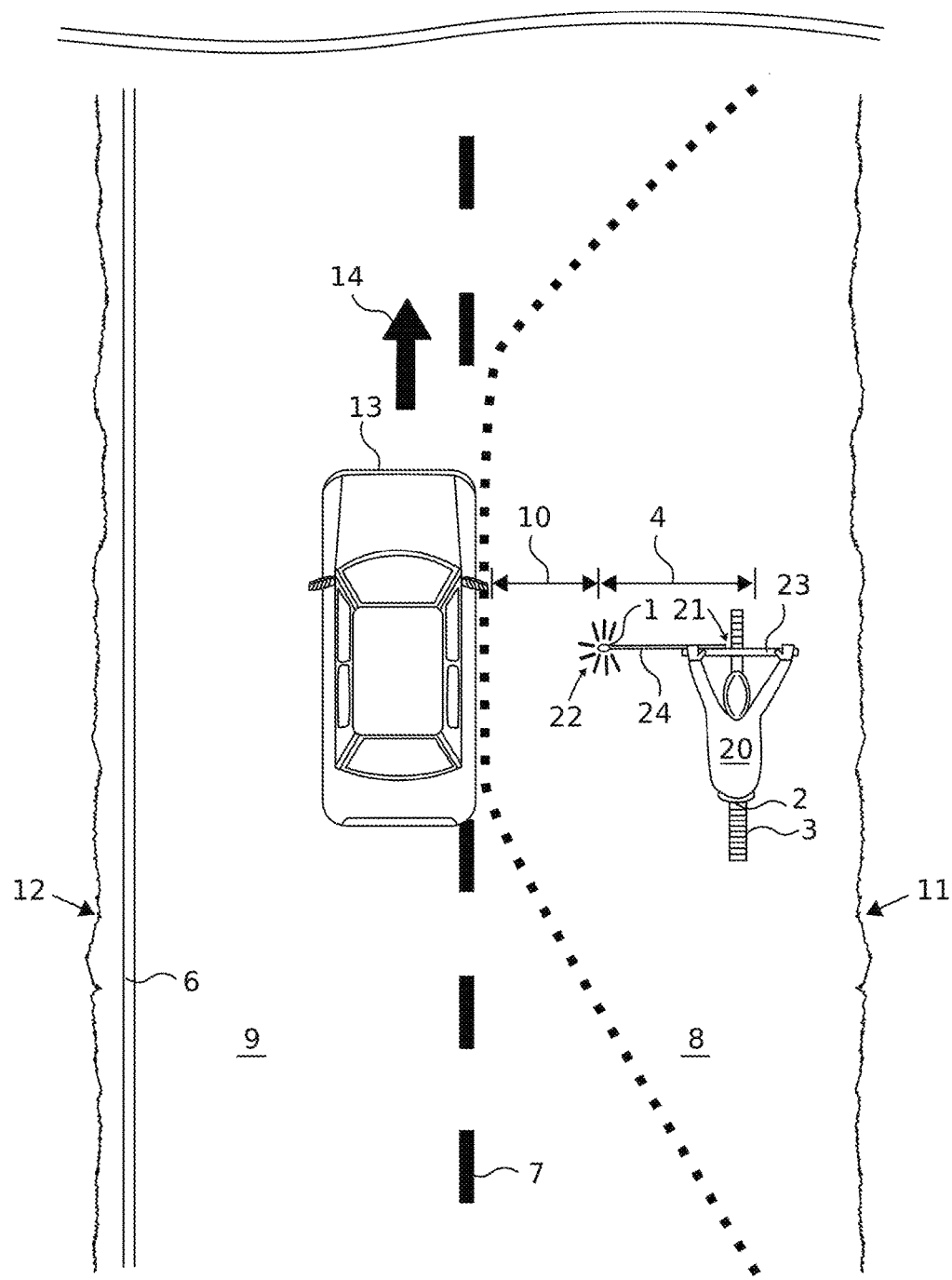
FIG. 2 is an overhead schematic view at the moment that a motor vehicle passes a bicycle equipped with an embodiment of the device first illustrated in FIG. 1.

FIG. 2 is an overhead schematic view at the moment that a motor vehicle 13 passes a bicycle equipped with an embodiment of the device first illustrated in FIG. 1. With reference to FIG. 2, a bicyclist 20 rides the bicycle 3 along a first or right-most edge 11 of a road. The road includes a first lane 8 and a second lane 9. The center line 7 is visible down the middle of the road. This stretch of road does not include a right-most white line. The bicycle 3 and bicyclist 20, and overtaking motor vehicle 13, are traveling in a forward direction 14. The center line 7 may be a yellow line, and thus the motor vehicle 13 needs to overtake the bicycle 3 and return as soon as possible to the right lane 8 to avoid oncoming traffic traveling in the opposite direction. The motor vehicle 13 is illustrated as a sedan but may be any overtaking vehicle. At the time of passing, the vehicle 13 is proximate to a left-most white line 6 which runs along the left paved border or edge 12. A right-most portion of the motor vehicle 13 is a passing distance 10 from the distal end of a lightweight pole 24.

According to a first embodiment, the device takes the form of a three-stage telescopic, chrome-plated flexible steel antenna-like rod or pole 24. The rod 24 may be made of other materials such as but not limited to a polyethylene-based material, an aluminum-based material, and a foldable set of hollow fiberglass lengths that are able to be mated end to end like a dome tent pole.

The second light 1 is a battery operated red light emitting diode (LED) light attached to or integrated with a distal end 22 of the rod 24, and preferably in the form of a tubular light that is visible from multiple directions. The proximal end 21 of the rod 24 is affixed to or may be integrated with a portion of the handlebars 23 of the bicycle 3. If the rod 24 is integrated into the handlebars 23, it is preferably telescope-able from the left side of the handlebars 23. According to an implementation, the rod 24 and second light 1 are purchased separately from the bicycle 3. The rod 24 is reversibly affixed to the handlebars 23 with straps (not labeled in FIG. 2). For example, accordingly to this implementation, five straps are used to affix a proximal portion or end 21 onto a left portion of the handlebars 23. Each strap is approximately five inches in length and ¾ inches in width. The length of the strap accommodates the handlebars 23 and the rod 24. The straps preferably include complementary portions of hook-and-loop fasteners so as to provide a lightweight, strong and re-usable securing mechanism for affixing the rod 24 to the handlebars 23. Alternatively, the rod 24 may be affixed with plastic one-way ties, a strong adhesive tape, a cloth-based tape, a foam-based handlebar bicycle grip tape, or other means. The rod 24 and second light 1 are designed to accommodate either a left side or right side extension by simply reversing the mounting of the rod 24 and orienting the second light 1 toward the rear.

In use, the telescopic rod or antenna-like extension 24 is extended approximately twenty-four to thirty-six inches from the end of the handlebars 23. According to a preferred implementation, the second light 1 is proximal to the distal end 22 of the rod 24. According to a specific embodiment, the second light 1 is a tubular light that is approximately 0.5 inches in diameter and approximately 7.25 inches long, and the second light 1 is an LED light. A tubular light allows emitted light to be viewed from all directions, not just from behind. Further, a tubular light does not tend to rotate and point the LED or other light emitting component downward. Preferably, the second light 1 emits light in multiple directions, but at least emits light in a rear direction relative to the bicycle 3. A second light 2 with a center of gravity outside of the axis of the rod 24 could cause a tubular rod to rotate relative to its mounting on the bicycle.

According to one implementation, a distance 4 from the proximal end 21 to the distal end 22 is thirty-six inches. Other sizes and lengths or distances 4 are possible for the device. The rod 24 and first light 1 serve as a safety device, a warning device that generates a buffer or air gap between passing motor vehicles 13 and the bicyclist 20. The trajectory of the motor vehicle 13 is visible as traveling line 15 in FIG. 2. The trajectory line 13 is static relative to the bicycle 3 and bicyclist 20; however, due to the limitations of illustration, the trajectory line 13 would be dynamic with respect to the center line 7 when both the bicycle 3 and motor vehicle 13 are in motion in the forward direction 14.

The bicyclist 20 may extend the rod 24 prior to mounting and riding the bicycle 3. Alternatively, the bicyclist 20 may extend the rod 24 during operation of the bicycle 3 as road, light and other riding conditions vary. For example, if a bicyclist 20 is required to pass proximate to a vehicle at a stop light, the bicyclist 20 may shorten or adjust the telescopic distance 4 of the rod 24 until the condition passes so as to avoid contact between an obstacle and the rod 24. Also, the telescopic distance 4 may be adjusted according to legal requirements. For example, if riding in a particular neighborhood or city with an ordinance that requires motor vehicles to pass a bicyclist with at least a distance of three feet instead of two feet, the bicyclist 20 can extend the rod 24 from a first distance to a second distance 4.

The second light 1 is preferably red. However, a red color is only a preferred color. Other colors are possible. For example, a second light 1 may be of another color, and which may communicate more than just a conceptual and actual safe legal passing distance around the bicyclist 20. For example, the second light 1 legally may be orange, yellow, blue or green. Such colors may be generated in any number of ways. For example, the second light 1 may include a light emitting electronic component which in turn may include a first type of LED for emitting light of a particular or first wavelength or particular hue. The light emitting electronic component may include a second type of LED for emitting light primarily of a second wavelength or hue. Alternatively, the second light 1 may include a light emitting electronic component that in turn includes two or more filters for adjusting the hue of the light emanating or projecting from the second light 1.

If the second light 1 is orange or yellow, this could come to mean and communicate a warning or lateral edge away from a bicycle 3 and bicyclist 20. Use of a color other than red for the second light 1 may convey a meaning dependent on social norms or regulations. For example, a second light 1 that is blue combined with a red second light 1 that is physically located to the right of the second light 1 could convey that the bicycle 3 is traveling in a forward direction 14, and not toward the motor vehicle 13. Thus, a bi-colored set of rear-facing lights 1, 2 may be implemented and used to convey more information than a set of two red rear-facing lights 1, 2.

Figure 3:
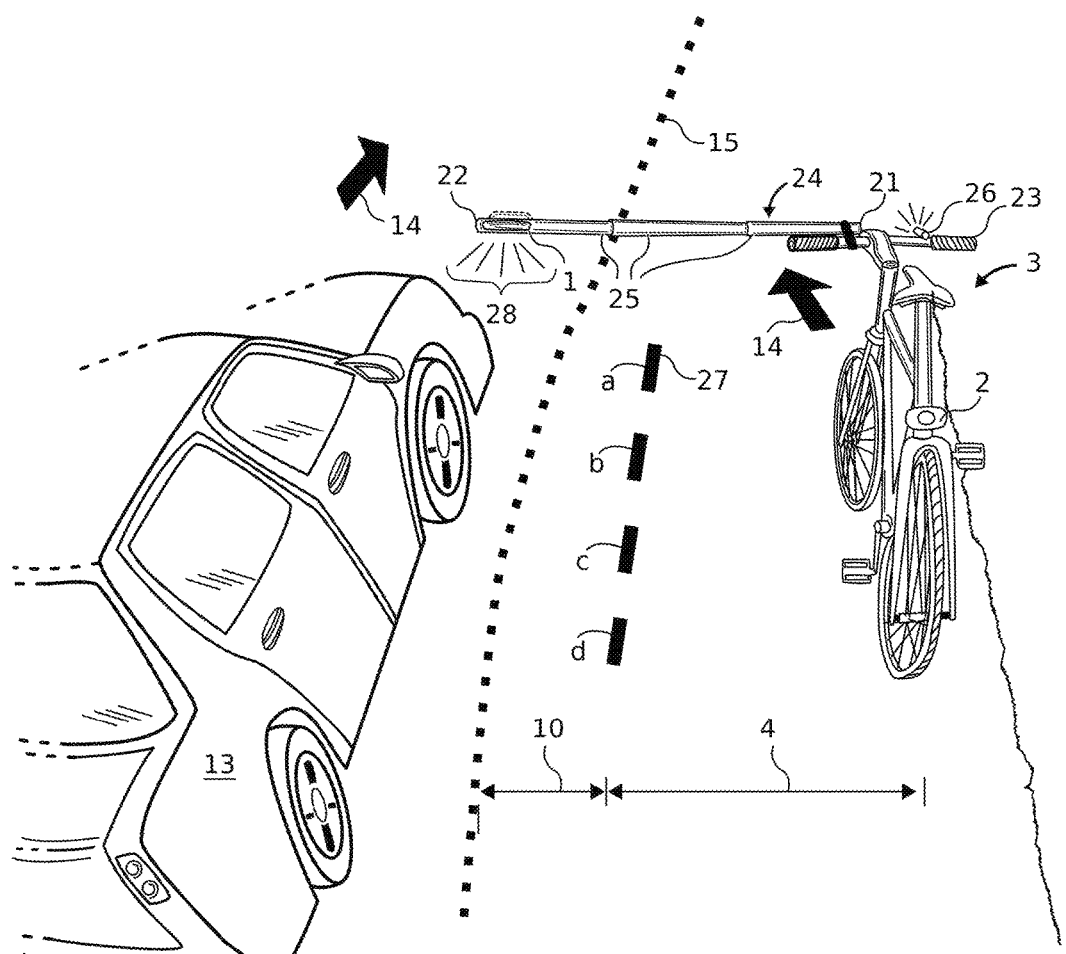
FIG. 3 is a forward perspective view of a motor vehicle passing a bicycle equipped with a device according to the instant invention.

FIG. 3 is a forward perspective view of a motor vehicle passing a bicycle equipped with a device according to the instant invention. With reference to FIG. 3, a motor vehicle 13 is passing the bicycle 3, both moving in a forward direction 14. The right-most edge of the motor vehicle 13 moves along the travel line 15 which is at a distance 10 away from the distal end 22 of the rod 24. The bicycle 3 includes a forward-facing headlight 26 mounted to the handlebars 23. The bicycle includes a first rear-facing light 2 along the median or center region of the bicycle. Extended a distance 4 to the left side of the bicycle 3 is a second light 1 with light marks 28 illustrating the illumination of the first light 1 toward the rear.

According to an additional feature of the device, also visible to the bicyclist (not shown) and the driver of the motor vehicle 13 is a series of line segments 27 or light projections. The line segments 27 are projected from the second light 1 or by another component light emitting component attached to or integrated into the rod 24. According to one implementation, the line segments 27 are static in time and travel in direction 14 as the bicycle 3 travels forward. According to another implementation, the line segments or marks 27 are projected intermittently or flash so as to convey motion and catch the attention of observers including the driver of the motor vehicle 13. For example, the line segments 27 may be displayed in sequence a, b, c and d as labeled in FIG. 3. In another alternative, alternating line segments a,c are projected for a half second, one second or two seconds and then line segments b, d are projected with a same or different time duration. In yet another alternative, the line segments 27 are sequentially projected one at a time such as in sequence d, c, b and a such that it shows where a border for a travel line 15 should be located relative to the bicycle 3. The color of the projected line segments may be red, orange, yellow or white.

With reference again to FIG. 3, the rod 24 is extendable and retractable. The rod 24 includes progressively small and nestable segments 25 with a segment at the distal end 22 being the thinnest in diameter. Thus, the distal end 22 of the rod is the lightest weight and amenable to receiving and carrying the second light 1. While not illustrated, each of the segments 25 may include a groove or rib that provides a mechanical structure that prevents each segment 25 from rotating with respect to each other. Rotation of one or more segments is possible as the bicycle 3 experiences road vibrations. The segments 25 could tend to rotate and overcome the inherent friction between segments 25 when the second light 1 is not perfectly mass balanced around a central axis through the rod 24. In an alternative implementation, the segments 25 may be combined with locking pins to prevent rotation (not illustrated) when the rod 24 is in an extended orientation.

According to an alternative embodiment, the device includes a series of illuminatable or light emitting elements, each mounted at a different location along the length of the last and lightest weight segment 25 at the distal end 22 of the device. Such series of lights may be equally spaced or may be placed along the rod 24 according to a geometric sequence or spacing between successive lights. Each of these lights in the series of lights is preferably rear-facing and red in color or hue. According to a mode of operation, each of these lights may be separately powered and illuminated. Each of the series of lights may be illuminated constantly over time. Alternatively, each of the series of lights may be turned on for a predetermined amount of time according to a program. For example, the series of lights may be illuminated in sequence from a proximal end 21 to a distal end 22 so as to communicate to an observer such as a driver of a motor vehicle that an arrow is pointing away from the center plane of the bicycle 3. The sequence may vary over time, or the sequence may vary temporary with individual lights being illuminated for its own preprogrammed amount of time. According to another illustrative program, each of the series of lights may be flashed randomly so as to provide a twinkling star effect. Other programs are possible with an increased number of lights in the series of lights. Movement, blinking and flashing of lights has been shown to be more effective in catching the attention of drivers of motor vehicles. Thus, a repeating regular or irregular pattern of flashing of the lights in the series of lights is envisioned according to the instant invention while still providing at least two points of reference for a driver overtaking a bicyclist. According to another variation, the intensity of illumination of the lights may work in conjunction with an ambient light sensor. For example, a brighter illumination of the lights in the series of lights may be implemented when the bicyclist and bicycle pass through a region of increased darkness so as to promote higher visibility and increased chance of creating a safety buffer when in such region.

Figure 4:
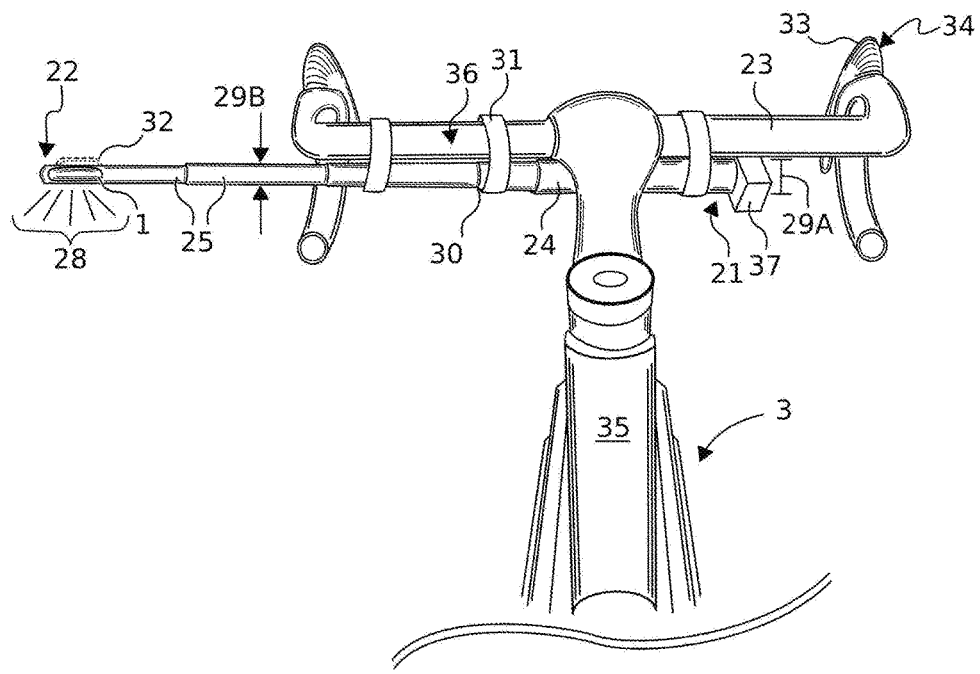
FIG. 4 is a perspective view from a generally top direction looking forward onto a portion of a bicycle to which is affixed a device according to another embodiment of the instant invention.

FIG. 4 is a perspective view from a generally top direction looking forward onto a portion of a bicycle 3 to which is affixed a device according to another embodiment of the instant invention. With reference to FIG. 4, a telescoping rod 24 is secured to the handlebars 23 of the bicycle 3. The handlebars 23 are of a traditional road bicycle. For reference, the top tube 35 of the bicycle 3 is visible. A set of three straps 31 hold the rod 24 in place. A series of nesting segments 25 are extended toward the left of the handlebars 23. Adjacent segments slide into one another at a junction 30. A first diameter 29A of the rod 24 at a proximal end 21 is larger than the diameter 29bB at the distal end 22. A gripping place 36 is visible on the left side of the handlebars 23 for resting a hand on top of the handlebars 23 when the bicyclist operates the bicycle 3. As illustrated, the rod 24 is mounted under the handlebars 23 so as to not interfere with the safe operation of the bicycle 3. The handlebars 23 include grips 33 on top of the brake levers 34.

In FIG. 4, a third light 32 is provided. The third light 32 is illustrated as a forward-facing light so as to provide an additional headlight for the bicycle 3. The third light 32 may be mounted or may illuminate on an opposite side of the rod 24 as that of a second light 1. The second light 1 is illuminated as indicated by the illumination marks 28. The third light 32 may also be integrated with the rod 24 and may also be a tubular light. According to one embodiment, the power source for the respective lights 1, 32 may be in the body or housing of the same. Each of these respective lights 1, 32 may include an on and off switch that is integral with their respective housings so that each light 1, 32 may be selectively illuminated. Alternatively, the rod 24 may house one or more power sources for these lights 1, 32 such that a substantial power source may be provided and thus may provide power over an extended time before being recharged.

The proximal end 21 of the rod 24 is rotatably mounted in a square shaped standoff or base 37 that is approximately three-quarters of an inch in size on a side. Other shapes of outer profile for the base 37 are possible such as a triangle, pentagon, crescent, and so forth. The base 37 is preferably made of or includes a friction-inducing material in contact with an outer surface of the rod 24 such as a rubber-like gripping material. The base 37 may take the form of an element having a socket for receiving the proximal end 21 of the rod 24. In an alternative embodiment, the base 37 is formed with a passage therethrough so that a user may laterally place the base 37 along any portion of the rod 24. Alternatively, the base 37 is lined with a foam rubber. In this implementation, the base 37 provides a mechanical component that facilitates maintaining the rod 24 in a correct orientation as the bicycle 3 is subjected to road vibrations. The round rod 24 when mounted proximate to the round handlebars 23 tends to experience rotation over time and the base 37 assists to prevent rotation of the rod 24 over time. The base 37 allows a bicyclist to rotate the rod 24 to a fixed position and thereby change the angle at which the second light 1 and forward-facing light 32 are oriented with respect to the horizon or road. In this figure, brake cables and gear changing cables have been omitted for sake of simplicity of illustration.

According to an alternative to the base 37, the first and largest segment of the rod 24 may be formed so as to have a concave surface along its length that serves to mate with an outer surface of the handlebars 23. Such segment 25 would remove the need for a square standoff or base 37 in some configurations of handlebars. It is within the scope of foreseeable variations of the device to have a rod 24 that is strongly contoured and complementary to handlebars 23 so as to facilitate comfortable gripping of the handlebars 23 and still provide a telescopic rod or antenna that may be laterally extended away from the bicycle for increased safety when riding at night.

Figure 5:
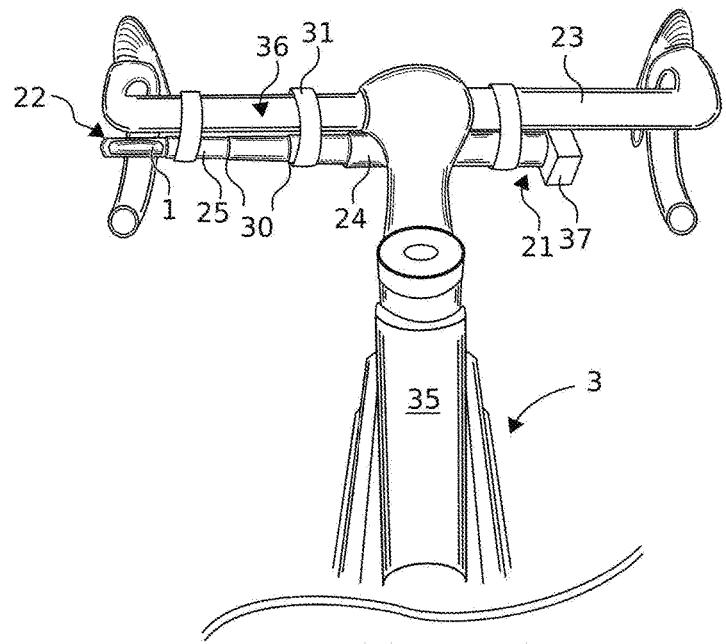
FIG. 5 is a perspective view similar to that of FIG. 4 with the device retracted.

FIG. 5 is a perspective view similar to that of FIG. 4. With reference to FIG. 5, the rod 24 is in a collapsed or retracted state with segments 25 nested into one another. Junctions 30 between rod segments 25 are visible and have been widened for sake of clarity in the illustration. The distal end 22 has been retracted to the point of being flush or inside the outer left edge of the handlebars 23 and thus near the outermost left side of the bicycle 3. Three straps 31 maintain the rod 24 securely to the handlebars 23. The straps 31 may be released and moved or adjusted laterally with respect to the handlebars 23 and with respect to segments 25 so as to accommodate various handlebar sizes and shapes. Further, the straps 31 provide a means for the rod 24 to break away from handlebars 23 and the bicycle 3 in the event of a significant impact of the rod 24 with an object such as an overtaking motor vehicle or stationary object. Thus, the amount of strength from the straps 31 that affixes the rod 24 to the bicycle 3 must be balanced against various contingencies and environment in which the device operates.

Figure 6:
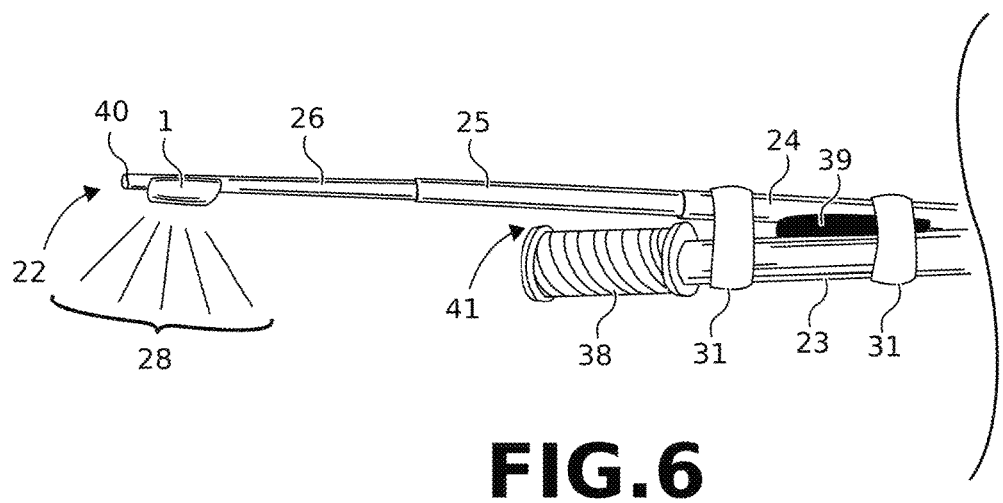
FIG. 6 is a perspective view of a handlebar with an alternative mounting of the device.

With reference to FIG. 6, the base 37 is illustrated as mounted to the proximal end 21 of the rod 24. The second light 1 is illustrated in a deactivated state and not in use, that is, not emitting light. However, the second light 1 may be operated in this position.

FIG. 6 is a perspective view of a handlebar 23 with an alternative mounting of the device. With reference to FIG. 6, the rod 24 is mounted to the handlebar 23 with straps 31. The handlebar 23 includes a conventional outer grip 38 for a mountain bike. A mounting wedge or base 39 facilitates application of straps 31 and facilitates maintenance of the rod 24 with respect to the handlebar 23. The wedge or base 39 forms a gap 41 between the grip 38 and the extended segments 25. The gap 41 allows a hand of a bicyclist the freedom to fully grip the handlebar on the left side. Such may be necessary for some handlebars and handlebar geometries so as to facilitate safe operation of the bicycle with the use of the extendable rod 24. For sake of clarity, a brake handle, brake cable and shifter have been omitted from this figure.

The light 1 is mounted to the distal end of the rod 24. The illumination marks 28 indicate that the light 1 is illuminated. While the second light 1 is illustrated as a modular component that is distinct from the rod 24, the light 1 may be integrated with one or more segments of the rod 24. That is, the light component may be the rod 24 itself. The rod 24 may be made of a transparent or translucent material, and the light 1 may take the form of one or more illuminatable elements so as to provide light in a plurality of direction simultaneously so as to increase visibility from a rear direction, a side direction and a front direction.

With reference to FIG. 6, as shown at the distal end 22 of the rod 24, an additional element 40 is embedded or placed therein. According to an alternative embodiment of the device, the additional element 40 may be an RFID tag, an RFID scanning antenna or both an RFID tag and RFID scanning antenna. Alternatively, the additional element 40 may be a digital camera that is configured to take pictures in the event that the arm or rod 24 is impacted from any direction.

In yet another alternative, the additional element 40 is a proximity such as a motion detector tuned to sense a surface of a passing motor vehicle. The additional element 40 determines when a motor vehicle or component thereof (e.g., transmitter, RFID tag) passes within a predetermined distance of the distal end 22 of the device. In this scenario, the additional component 40 may be connected to an electronic audible tone generator housed within or adjacent to the rod or device 24. When activated, the tone generator emits a tone for immediately alerting the bicyclist, the motor vehicle operator or both the bicyclist and motor vehicle operator. According to a variation, the additional component 40 may be electronically connected to a programmable circuitry that triggers flashing of the second light 1 so as to provide a visual signal that changes when a motor vehicle approaches too closely to the distal end 22 of the device.

According to another variation, when the additional element 40 includes an RFID scanning antenna and an impact detector (e.g., gyroscope, accelerometer), the device may be able to uniquely identify a passing motor vehicle based on the contents of an RFID tag or contents of a radiated or signal. Specifically, the device may be equipped with circuitry to record in an onboard electronic memory the contents of the RFID tag when the accelerometer detects a value exceeding a certain threshold or event. For example, when the distal end 22 of the device is impacted by a motor vehicle, and the motor vehicle is equipped with an RFID tag. Upon detection of an impact, the RFID antenna is triggered to query any nearby RFID tag. In this way, the additional element or elements 40 may be able to identify a motor vehicle that impacts the device, such electronic components added to the device would cause the price of production of the device to be substantially increased but would be possible due to ever decreasing costs of producing electronic components.

According to yet another embodiment, the additional element 40 at the distal end 22 of the device, or the entire last segment 25 may be made of a substance that leaves a plastic film or grease mark on any surface with which the additional element 40 contacts. In such embodiment, when the additional element 40 is impacted by a motor vehicle, the surface of the motor vehicle is marked for future reference by either the driver of the motor vehicle or the bicyclist. In another implementation, the last segment 25 is made of an non-marking poly-fluoro compound so as to minimize the potential for leaving a mark on a surface that impacts the distal end 22 of the rod 24.

Conclusion. While the previous description emphasizes safety at night, the device and its variants also can provide substantial increased safety during the day and in a variety of traffic and other conditions. The device generally can provide a safety zone around a bicycle when traveling with motor vehicles and in other circumstances.

In the previous description, for purposes of explanation, numerous specific details are set forth in order to provide an understanding of the invention. It should be apparent to one skilled in the art that the invention can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the invention. In this technology, advancements are frequent and further advancements are not easily foreseen. The disclosed embodiments may be readily modifiable in arrangement and detail as facilitated by enabling technological advancements without departing from the principles of the present disclosure.

I claim:

1. A device for promoting safe overtaking of a bicyclist by a driver of a motor vehicle, the device comprising:
   a telescopically-adjustable flexible rod including a proximal end for mounting to a bicycle handlebar, a distal end extended laterally away from the bicycle handlebar, a length from the proximal end to the distal end, and extendable segments that form the length thereof including a first segment having a concave surface for coupling the first segment to an outer surface of the bicycle handlebar;
   a light emitting electronic component at the distal end of the flexible rod;
   a power source for the light emitting electronic component; and
   a switch for electronically connecting the power source to the light emitting electronic component.

2. The device of claim 1, the device further comprising:
   a base forming a hollow passage therethrough for receiving a first segment of the flexible rod, the base placeable at any point along the first segment, and wherein the base includes a shaped outer surface that restricts rotation of the flexible rod relative to the bicycle handlebar;
   and wherein the telescopically-adjustable flexible rod is extendable over a range of lateral lengths for extending the light emitting electronic component laterally away from the bicycle to a desired location laterally adjacent to the bicycle.

3. The device of claim 1, wherein the light emitting electronic component is oriented in a substantially rearward direction relative to the bicycle, and wherein at least one of the segments includes a rib along at least a portion of its length that prevents the respective segments from rotating with respect to each other.

4. The device of claim 1, wherein the extendable segments are nestable, one segment substantially inside another, wherein a first segment at the proximal end of the flexible rod has a largest outer diameter with respect to the other segments, wherein the concave surface of the first segment extends along at least a portion of its length, and wherein each of the segments is made of a chrome-plated flexible steel.

5. The device of claim 1, wherein the power source is mounted proximate to the light emitting electronic component, the device further comprising an ambient light sensor configured to increase an intensity of illumination of the light emitting electronic component with increased darkness.

6. The device of claim 1, and wherein the light emitting electronic component includes a component for projecting light of a first hue and separately light of a second hue, and wherein the light emitting electronic component includes a switch for changing projection of which hue of light.

7. The device of claim 1, wherein the light emitting electronic component is configured to emit light in the rearward direction, and to project at least one light projection downward onto a surface travelled upon by the bicycle.

8. The device of claim 7, and wherein the light emitting electronic component projects light in a red hue.

9. The device of claim 7, and wherein the light emitting electronic component projects a plurality of light projections downward onto the surface travelled upon by the bicycle.

10. The device of claim 9, and wherein the light emitting electronic component varies, over time, projection of the plurality of light projections.

11. A bicycle safety device for night riding, the device comprising:
- an arm made of a flexible material and comprised of segments including a first segment, and wherein the arm includes a proximal end mounted to a handlebar of a bicycle and a distal end for extending laterally away from a side of the bicycle, and wherein the arm includes a length from the proximal end to the distal end;
- a light emitter mounted to or within the distal end half of the arm;
- a power source for the light emitter; and
- a base forming a hollow passage therethrough for receiving a first segment of the arm, the base placeable at any point along the first segment, and wherein the base includes a shaped outer surface that restricts rotation of the arm relative to the bicycle handlebar.

12. The bicycle safety device of claim 11, and wherein the flexible material is a metal, and wherein the metal is plated with a chrome-based protective coating.

13. The bicycle safety device of claim 11, and wherein the arm is made from a fiber-based material, and wherein the light emitter is oriented in a substantially rearward direction relative to the bicycle, and wherein the first segment includes a concave surface that extends along at least a portion of its length for mating the first segment with the handlebar of the bicycle.

14. The bicycle safety device of claim 11, and wherein the arm is at least thirty inches as measured from the proximal end to the distal end in length when the segments are extended, and wherein the arm is flexible such that the distal end of the arm flexes at least ten inches relative to the proximal end when the distal end is exposed to a lateral force of ten pounds.

15. The bicycle safety device of claim 11, and wherein the segments are connected end to end with each other, and wherein the bicycle safety device further comprises a tubular sleeve for each joint between adjacent connected segments.

16. The bicycle safety device of claim 11, wherein the segments are nested inside one another at least along a portion of a respective length, wherein the arm is extendable with one pound of force or less.

17. The bicycle safety device of claim 11, and wherein at least a portion of the arm is translucent and the light emitter is mounted inside the translucent portion of the arm, and wherein at least a portion of the distal end of the arm includes a non-marking poly-fluoro material.

18. The bicycle safety device of claim 11, and wherein the arm is substantially circular in cross section, and wherein a diameter of a portion of the distal end of the arm is approximately 0.15 inches or less.

19. The bicycle safety device of claim 11, and wherein the light emitter is operated so as to provide a blinking light signal.

20. The device of claim 1, further comprising:
- a strap including hook and loop fasteners reversibly securing the first segment to the bicycle handlebar, the strap configured to allow the first segment to break away from the bicycle handlebar upon lateral impact of the flexible rod with an object beyond an edge of the bicycle handlebar thereby ensuring safe operation of the bicycle in motion.

* * * * *